United States Patent
Criniere et al.

(10) Patent No.: US 10,919,803 B2
(45) Date of Patent: Feb. 16, 2021

(54) PROCESS FOR MANUFACTURING A MILK OF SLAKED LIME OF GREAT FINENESS AND MILK OF LIME OF GREAT FINENESS THEREBY OBTAINED WITH PROCESS WATER

(71) Applicant: S. A. Lhoist Recherche et Developpement, Ottignies-Louvain-la-Neuve (BE)

(72) Inventors: Guillaume Criniere, Braine-l'Alleud (BE); Robert Sebastian Gartner, Buizingen (BE)

(73) Assignee: S. A. Lhoist Recherche et Developpement, Ottignies-Louvain-la (BE)

( * ) Notice: Subject to any disclaimer, the term of this patent is extended or adjusted under 35 U.S.C. 154(b) by 126 days.

(21) Appl. No.: 16/082,331

(22) PCT Filed: Mar. 7, 2017

(86) PCT No.: PCT/EP2017/055270
§ 371 (c)(1),
(2) Date: Sep. 5, 2018

(87) PCT Pub. No.: WO2017/153379
PCT Pub. Date: Sep. 14, 2017

(65) Prior Publication Data
US 2019/0092684 A1   Mar. 28, 2019

(30) Foreign Application Priority Data

Mar. 8, 2016 (WO) ............... PCT/EP2016/054941

(51) Int. Cl.
| | | |
|---|---|---|
| *C01F 11/02* | (2006.01) | |
| *C04B 2/06* | (2006.01) | |
| *C04B 28/10* | (2006.01) | |
| *C04B 2/08* | (2006.01) | |
| *C04B 2/00* | (2006.01) | |

(52) U.S. Cl.
CPC ............... *C04B 2/06* (2013.01); *C01F 11/02* (2013.01); *C04B 2/08* (2013.01); *C04B 28/10* (2013.01); *C01P 2004/61* (2013.01); *C01P 2006/22* (2013.01); *C04B 2/005* (2013.01)

(58) Field of Classification Search
CPC ....................................................... C01F 11/02
See application file for complete search history.

(56) References Cited

U.S. PATENT DOCUMENTS

| | | | |
|---|---|---|---|
| 3,511,600 A | | 5/1970 | Kim |
| 4,464,353 A | * | 8/1984 | Hains ............... C02F 1/529 423/640 |
| 5,275,650 A | | 1/1994 | Mongoin et al. |
| 5,492,685 A | * | 2/1996 | Moran ............ B01D 53/502 423/244.07 |
| 7,326,400 B2 | * | 2/2008 | Huege ............. C01F 11/02 423/637 |
| 2004/0175324 A1 | | 9/2004 | Hassibi |

FOREIGN PATENT DOCUMENTS

| | | |
|---|---|---|
| EP | 1840097 A1 | 10/2007 |
| FR | 2995301 A1 | 3/2014 |
| WO | 02092701 A1 | 11/2002 |
| WO | 2014064234 A1 | 5/2014 |
| WO | 2016037972 A9 | 3/2016 |
| WO | 2016041643 A1 | 3/2016 |

OTHER PUBLICATIONS

General Treussart; "On Hydraulic and Common Mortars"; Translated from the French by J. G Totten, et al.; 15 pages; Journal of the Franklin Institute; vol. 24, No. 4; Oct. 1987.
PCT/EP2017/055270; International Search Report; 2 pages; dated May 17, 2017.

* cited by examiner

*Primary Examiner* — Stuart L Hendrickson
(74) *Attorney, Agent, or Firm* — Whitaker Chalk Swindle & Schwartz PLLC; Charles Gunter

(57) ABSTRACT

Process for manufacturing a milk of lime of great fineness comprising at least the steps of providing one lime compound and forming said milk of lime with a process water and said lime compound.

18 Claims, No Drawings

PROCESS FOR MANUFACTURING A MILK OF SLAKED LIME OF GREAT FINENESS AND MILK OF LIME OF GREAT FINENESS THEREBY OBTAINED WITH PROCESS WATER

The present invention relates to a process for manufacturing a milk of lime of great fineness comprising at least the steps of a) providing a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture, and b) forming a milk of slaked lime of great fineness with said lime compound by the addition of a fourth water to said lime compound or by the addition of the first lime compound to a fourth water.

Such a process is described in non published International patent application n° PCT/EP2015/060114 and PCT/EP2015/070367. According to this non published patent application, by the addition of water to lime compound instead of the addition of a lime compound to water, it was made possible to reach a milk of lime of great fineness and with a controlled viscosity.

Lime is a calcium-magnesium based compound herein after called calcium based compound.

Calcium based compounds such as CaO and $Ca(OH)_2$ have many practical uses. For instance, these substances are used in treating drinking water, waste water and sewage, in the flue gases treatment, as soil neutralizing agents and nutrients, for ground stabilization in construction, in the mining and metal industry, and as components of building materials.

Calcium oxide, CaO, is often referred to as "quicklime", while calcium hydroxide, $Ca(OH)_2$, is referred to as "hydrated lime", both sometimes being informally referred to as "lime". In other words, lime is an industrial product, based on calcium oxide or hydroxide, respectively. Quicklime is usually in the form of lumps or pebbles but it can also be a powder. Dry hydrated lime is usually a powder. According to present industry practices, in order to further process these compounds and improve the ease with which they are handled, dry CaO or dry $Ca(OH)_2$ may be mixed with water to form an aqueous suspension, i.e., a slurry, also called milk of lime, which is a fluid suspension of slaked lime, also referred to as hydrated lime (calcium hydroxide—$Ca(OH)_2$), which can obviously include impurities, in particular silica, alumina, unburnt limestone ($CaCO_3$), magnesium oxide or magnesium hydroxide to the extent of a few percent.

Such a suspension is obtained either by slaking quicklime (calcium oxide—CaO) with a large excess of water, or by mixing hydrated lime with water.

The resulting aqueous suspensions are characterized by the concentration of the mass of the solid matter (% solids), the chemical reactivity of the slurry to neutralize an acid and the distribution of the sizes of the particles in suspension (controlling in part viscosity).

These characteristics determine the properties of the slurry, mainly its viscosity and its reactivity.

When a milk of lime is obtained from hydrated lime, hydrated lime particles are suspended in water. The hydrated lime is produced by common atmospheric hydrators which may or may not have size classifying systems where quicklime is added to water in a pre-mixer, at a specific mass ratio and allowed to mix together with said water in what is termed a seasoning chamber. The temperature in the hydrator is less than 100° C. (212° F.). The particle size distribution will vary depending upon the nature of the quicklime starting material used, as well as the particular manufacturing process employed (presence of a size classifying system or not, screening or milling system). Milk of lime made from hydrated lime will have a particle size distribution similar to that of the hydrate from which it is produced and the solids content can commonly vary from 5 to 40 w. %.

Milk of lime made from quicklime, in an industrial, continuous process, is typically produced by common paste, detention, or ball mill slakers (Boyton, 1980). In all cases, quicklime is added to an excess amount of water and mixed together, to produce slurry with a solid content ranging from 5 to 30 w. %. The water reacts with the quicklime particles during the slaking operation in an exothermic reaction to form slaked lime. During the slaking of quicklime with an excess of water, the temperature of hydration is below 100° C. (212° F.). The particle size distribution of the milk of lime is a function of both the nature of the quicklime and the coarse fraction removal systems, which include screening, settling and milling.

Lime slurries can be made either in batches or in a continuous process.

An example of lime slurries made in batches is disclosed in document U.S.2004/0175324. According to this document, the quality of milk of lime produced by batches is no more different from a batch to another batch as a temperature regulation system is provided. When temperature increases, water is further added to cool the reaction medium and when temperature is too low, quicklime is further added as slaking is exothermic reaction.

This document is silent about the real properties of the milk of lime thereby produced. There is no information regarding the particle size, reactivity viscosity and similar characterizing properties. No additive used during slaking are mentioned.

According to this document (see § 0014), after each batch discharge, water is added to the reaction vessel initially and lime is added afterwards. It is only after this initial step that regulation of temperature occurs.

Another example of manufacturing milk of lime in batches is disclosed in document U.S. Pat. No. 3,511,600. According to this document water or a milk of lime is contained in a reaction vessel forming an aqueous medium to which lime (quicklime partially hydrated) is added. After this addition of lime to aqueous medium, temperature is controlled. The particle size of the milk of lime is 8 µm after removing the grits.

Many other attempts have been done to reach milk of lime of great fineness where handling of the final suspension is possible.

Document U.S. Pat. No. 5,275,650 discloses milk of lime manufactured with the addition of dispersant polymers during grinding in aqueous medium of a milk of lime (already prepared). The example 1 relates to prior art milk of lime with grinding agent added from 1 to 2 weight % in dry/dry solid content. The median diameter after grinding is more or less between 2 and 5 µm. The example 2 relates to the invention of document U.S. Pat. No. 5,275,650. The dispersant polymer of a specific nature is added to milk of lime for grinding the particles and the size reached is between 2 and 3 µm when the molecular weight of the polymer is less than 1900.

Document WO02/092701 discloses lime slurry produced by the addition of lime to water, where the water comprises two additives. The first additive being an active polymer, typically an anionic polymer, such as sodium acrylic acid polymer to an extend between 0.1 and 5, preferably between 0.1 and 3 weight % and the examples discloses an addition of 0.5 or 0.75 weight % active polymer addition.

The second additive is a base, preferably sodium hydroxide to an extend between 0.1 and 5, preferably between 0.1 and 3 weight % and the examples discloses an addition of 0.5 or 0.75 weight % sodium hydroxide to reach lime slurry with particle size between 0.5 and 20 μm, preferably between 0.5 and 10 μm with an acceptable viscosity, less than 2000 cP (mPa·s).

Document WO 2014/064234 in the name of the present applicant relates to an improvement in terms of stability of the viscosity of the milk of lime. To this end, an additive is added based on a phosphonate or phosphonic acid at an amount equal to or less than 5 weight %, preferably equal to or less than 3 weight %, more preferably equal to or less than 2 weight %, and more particularly equal to or less than 1.5 weight % of active acid with respect to the total weight of the solid content.

By this addition, the mean particle size reached in the milk of lime is between 1 and 20 μm and the viscosity is low and remains low over time (less than 1500 mPa·s). The lime is added to an aqueous phase and the phosphonate or phosphonic acid can be added to the aqueous phase, before during or after the formation of the lime slurry.

Document FR2995301 discloses a milk of lime of great fineness having a distribution profile being monomodal and for which the notation $d_{90}-d_{10}$ is lower or equal to 15 μm. As it can be seen from the example, quicklime is added to water in a hydrator, the water being possibly process water, meaning in the context of FR2995301 a water having a temperature of 40° C., meaning a clean water, from which heat can be recovered to improve the particle size distribution of the milk of lime. No additive is mentioned in the document and the great fineness is reached by at least one classification step in order to make a very reactive milk of lime.

It is generally economically advantageous to be able to increase the solid content of the milk of lime, in order to reduce the transportation costs and the size of the equipment (storage reservoirs, pumps etc.).

The economics of transporting 5-30 w. % solid content milk of lime is poor as it requires large storage tanks, pumps and equipment. This accounts for the fact that most milk of lime slakers are located where the milk of lime is being used.

Equipment and processes for on-site slaking are notably disclosed in US patent U.S. Pat. No. 5,507,572. Quicklime is added to water in a batch tank which is equipped with horizontal paddles for mixing. The resulting milks of lime have a particle size distribution, $d_{50}$ value, of around 10 to 20 μm. Gypsum may be added to increase the particle size in order to reduce the initial viscosity of the milk of lime. The solid content achieved is generally in the range of 30-40 w. %.

However, the on-site slaking is not really feasible everywhere and can become very expensive when the availability of sufficiently clean water is difficult. Indeed, the quality of water was found over the past years as a critical element in order to not perturb the slaking operation and to be able to control the particle size and viscosity, being in fact quite closely linked one to each other.

By the term viscosity, it is meant in the present application, dynamic or absolute viscosity measured in the centipoise (cP) unit or in the millipascal-second (mPa·s) unit. One centipoise is equal to one millipascal-second (mPa·s) in the International system of Units. With regard to milk of lime applications, experience has made it possible to establish that it is desirable not to exceed a viscosity of about 1500 mPa·s, in some industrial applications, preferably not to exceed about 400 mPa·s.

Viscosity is controlled by both the solid content and the particle size. The more solid content the more viscous will be the aqueous suspension. Moreover, an aqueous suspension with the same solid content but with different particle size distribution will have different viscosity value. The finer the particle size, the higher the viscosity.

Particle size of milk of lime is an important characteristic in considering notably its relative neutralization and/or precipitation kinetics. This is referred to as reactivity of a milk of lime which can notably be measured by conductivity measurement of a solution made by diluting a small amount of said milk of lime in a large volume of demineralized water. This technique is disclosed in the European standard EN 12485. It is known that the dissolution rate of the particles of lime in demineralized water is more rapid when the particle size is smaller. In other words, the reactivity of the milk of lime is usually higher when its constitutive particles are smaller.

Particle size of milk of lime is also an important characteristic in considering the settling rate or sedimentation rate of the solid phase of the suspension. The coarser the particles the faster the milk of lime will settle and the faster it settles the more probably intermittent or continuous mixing will be required to maintain a consistent solid content. Settling or sedimentation can also generate a hard-packed sediment that is not easily suspended even with vigorous agitation.

Fine milk of lime with high solids content, relatively low viscosity and high reactivity is particularly preferred in some industrial applications.

Besides, several attempts have been made to produce milks of lime with unclean waters, such as industrial waters, as the slaking water. However those attempts led to coarse milks of lime or required complex and costly processes to obtain milks of lime with sufficiently fine particle size. Even in these cases, the resulting milks of lime are generally too viscous and/or contain a high amount of organic compounds, the latter being undesirable for some applications.

Unfortunately, all the existing alternatives for producing fine milks of lime from quicklime present drawbacks such as, without being limitative, a restriction on the type of quicklime that can be used and the availability of qualitative clean water to control the slaking operation.

Therefore, presently, there is still a need for a reliable and easy way to produce a milk of lime of great fineness while avoiding the aforementioned drawbacks of the prior arts, notably restrictive dependency on properties of the starting material and the availability of clean slaking water or the costs of using clean slaking water.

To solve this problem, the present invention provides a process for manufacturing a milk of lime of great fineness as mentioned in the beginning characterized in that at least one of the first, second, third or fourth water is process water chosen in the group consisting of alkaline water, saline water, sulfate water comprising from 3 to 300 g solute/dm³, preferably at least 5.5, preferably at least 7, preferably at least 10, more preferably at least 15, more particularly at least 20, most preferably 30 g of solute/dm³ and preferably at most 250 g/dm³, more preferably at most 200 g/dm³, most preferably at most 175 g/dm³, even more preferably less than 150 g/dm³, and in that at least one of the first, second, third or fourth water is added to said lime compound, meaning by using a specific manufacturing process wherein water used for slaking operation is a process water which is added onto the lime compound, said milk of lime of great fineness having slaked lime particles presenting a $d_{50}$ greater than or equal to 1 μm and lower than or equal to 6 μm, measured by Laser Diffraction using methanol as carrier solvent after screening of the milk of lime at 2 mm through a sieve for removing the grits and if needed after applying ultrasonic treatment.

It has been surprisingly found according to the present invention that when adding water to a lime compound for producing a milk of lime, the purity of water is not a restriction and can even promote the reaching of a low viscosity milk of lime, with small particle size and high solid content.

It was indeed made possible according to the present invention to use process water such as
  a) alkaline water, such as alumina refinery process drainage water, white or green liquor from the production of paper pulp or solutions from other recausticisation processes—such solutions commonly have a pH ranging from 13 to 15 and generally comprise between 5 to 300 g/dm$^3$ of alkaline inorganic compounds with respect to the volume of the alkaline water; preferably at least 7, preferably at least 10, more preferably at least 15, more particularly at least 20, most preferably 30 g of solute/dm$^3$ and preferably at most 250 g/dm$^3$, more preferably at most 200 g/dm$^3$, most preferably at most 175 g/dm$^3$, even more preferably less than 150 g/dm$^3$
  b) saline waters, such as sea water, brackish waters or hypersaline waters such as chloride brines, nano-filtration or ultrafiltration retentates of membrane desalination processes or concentrates of evaporative desalination such as multi-effect evaporation or (multi-stage) flash evaporation—such solutions can have concentrations of dissolved salts—often, but not exclusively chloride salts (i.e. e.g. magnesium, potassium or sodium chloride)—in the range of 3 to 300 g/dm$^3$ of saline compound with respect to the volume of saline water; preferably at least 5.5, preferably at least 7, preferably at least 10, more preferably at least 15, more particularly at least 20, most preferably 30 g of solute/dm$^3$ and preferably at most 250 g/dm$^3$, more preferably at most 200 g/dm$^3$, most preferably at most 175 g/dm$^3$, even more preferably less than 150 g/dm$^3$.
  c) sulfate-containing waters, such as sulfate brines, leach solutions in hydrometallurgical ore processing, such as e.g. nickel, copper or cobalt ore leaching, or any other solutions of processes, sulfate containing industrial effluents as well as lime treated sulfate-containing effluents, i.e. gypsum saturated solutions—such solutions can typically contain inorganic sulfate or sulfite compounds with a concentration ranging from 1 to 100 g/dm$^3$ expressed as $SO_3$ with respect to the volume of sulfate containing water; preferably at least 3, preferably at least 5.5, preferably at least 7, preferably at least 10, more preferably at least 15, more particularly at least 20, most preferably 30 g of solute/dm$^3$ and preferably at most 90 g/dm$^3$, more preferably at most 85 g/dm$^3$, most preferably at most 75 g/dm$^3$, even more preferably less than 65 g/dm$^3$.

to reach a milk of lime of great fineness, with a high reactivity and reaching the standards of the use of such milk of lime.

For the evidence of doubt, process water is so here used in contrast to clean water and comprises typically between 3 and 300 g solute/dm$^3$.

In the meaning of the present invention, the addition of process water yield to the addition of solute content with respect to the solid content of the milk of lime with a mass ratio comprised between 0.15 and 15 preferably greater than 0.20, more preferably greater than 0.30, and preferably lower than 10, and more preferably lower than 5.

This is even more surprisingly, knowing that typically, the presence of sulfates in water leads to strong milk of lime coarsening in classical slaking. The same is observed to a lesser degree also for highly saline water (notably seawater and Brackish water).

The present invention opens therefore new perspectives for on-site slaking process, even if not limited to, where clean water is rare and/or expensive, while process rinse water, process spillage water, drainage water are more abundant and cheap, being in any case, very often stored in lake for sedimentation and further treated as waste water.

Further, according to the present invention, it was also observed that the low viscosity of the milk of lime of great fineness is stable over time.

The milk of slaked lime obtained according to the invention presents therefore a high reactivity, due to its great fineness, not necessarily linked to the reactivity of the quicklime initially used, but also not depending on the quality of the water used in the slaking process.

As it can be understood from the aforementioned, the process of manufacturing a milk of lime of great fineness according to the present invention is particularly useful in that a milk of slaked lime of great fineness is easily obtained at competitive costs since either not requiring high quality water nor requiring very reactive quicklime neither complex equipment.

The milk of lime of great fineness according to the present invention has been advantageously obtained by providing a specific selection of a lime compound chosen in the group consisting of a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture to a step of forming a milk of slaked lime of great fineness either by a subsequent slaking step or by a subsequent dilution step.

Prehydrated lime is made by particles which are made of a core of quicklime (CaO) and a coating of hydrated lime ($Ca(OH)_2$) which is forming a temporarily regular layer covering the CaO core. In a preferred embodiment, said prehydrated lime comprises a quicklime content comprised between 40 and 96 w % with respect to said total weight of said prehydrated lime and a hydrated lime content comprised between 60 and 4 w % with respect to said total weight of said prehydrated lime.

In a preferred embodiment of the process according to the present invention, said at least one of the first, second, or fourth water is added to quicklime through a progressive addition of said at least one of the first, second, or fourth water to quicklime under agitation condition.

By progressive addition of water, it means that addition of water is distributed over time in the case of a batch process or distributed over space for a continuous process. In some embodiments, the distribution is regular but in the frame of the optimization of the process, some addition can be made faster for not critical phases of the process. In general terms, it means that addition of water is distributed over the conversion of the lime compound. In the specific case of the batch process, it can be understood as a quantity of water added onto a quantity of lime compound during a certain time and can be expressed as g of water per kg of lime compound per minutes. In the specific case of the continuous process, it can be seen as a distributed flow of water added stepwise on to a flow of lime compound, introduced at the inlet of the process, during a certain residence time and can be expressed as g/min. of water per kg/min. of lime per minute of residence time. Ultimately, in both cases, it is corresponds to g/kg/min. Typically, this ratio determines the pattern of addition and its value is comprised between 30 g to 300 g of water per kg of quicklime and per minute, which corresponds e.g. for a milk of lime of 45% solids content to a residence time of about 2 to 20 minutes.

When the addition of said at least one of the first, second, or fourth water added to quicklime is made progressively under agitation, this yields to the fact that during the progressive addition of the first, the second or even the fourth water to quicklime, a first intermediate compound is formed being prehydrated lime.

In a first embodiment, the quicklime progressively hydrated by the first or the fourth water forming the prehydrated lime is further hydrated by fourth water further progressively added. The prehydrated lime then progressively disappears with completion of the progressive addition of the fourth water. This progressive addition of water allows reaching a high temperature during the hydration step forming very small particles.

In a second embodiment, the quicklime progressively hydrated by the first or the fourth water forming the prehydrated lime is further hydrated by fourth water to which said prehydrated lime is added, progressively or not. This progressive addition of first or fourth water allowed to reach a high temperature during the prehydration step forming very small particles.

In a third embodiment, the quicklime progressively hydrated by the first or the fourth water forming the prehydrated lime is stored before further hydration. This may be a storage on site or remotely before shipping on-site where further hydration by fourth water will be done, progressively or not and by addition of fourth water to prehydrated lime or by addition of prehydrated lime to fourth water. This progressive addition of first or fourth water allowed to reach a high temperature during the prehydration step forming very small particles.

In another preferred embodiment, said third water or said fourth water is added to prehydrated lime through a progressive addition of said third or fourth water to prehydrated lime under agitation condition.

According to this another embodiment, said third water added to prehydrated lime can be added to commercial prehydrated lime or to prehydrated lime formed by a progressive addition of first water to quicklime.

In the case the third water is added progressively to prehydrated lime to form a paste of lime, the further fourth water added to the paste of lime can be added progressively or not to the paste of lime.

In a variant where the third water is added progressively to prehydrated lime to form a paste of lime, the paste of lime is further added to the fourth water.

In still another preferred embodiment, said fourth water is added to paste of lime through a progressive addition of said fourth water to paste of lime under agitation condition.

In a first particular embodiment of the process according to the present invention, said progressive addition of said at least one of the first, second, third or fourth water to said lime compound is presenting a pattern of addition of said at least one of the first, second, third or fourth water for controlling water uptake by the lime compound in a batch process or in a continuous process.

By the terms pattern of addition of water, it is meant according to the present invention that the water addition should be controlled with respect to, for instance, its flow rate, the duration of the water addition or even the distance along which water is added to lime if the prehydrated lime, the paste of lime or the milk of lime is made in a continuous step.

If the step of forming the prehydrated lime, the paste of lime or the milk of lime concerned by the present invention is a batch process, the key factor will be the amount of water taken up by a predetermined amount of lime, optionally containing additives and/or the spreading of the water upon/ within the quicklime or the prehydrated lime in the batch process and/or the agitation parameters.

Said progressive addition of said at least one of the first, second, third or fourth water to said lime compound presenting a pattern of addition for controlling water uptake by the lime compound may be according to the present invention either said at least one of the first, second, or fourth water added to quicklime, said third water or said fourth water added to prehydrated lime, said fourth water added to paste of lime.

In a second particular embodiment of the process according to the present invention, said progressive addition of said at least one of the first, second, third or fourth water is a continuous process during which progressive hydration of said lime compound is performed by adjusting lime compound feeding rate into a hydrator wherein a predetermined atmosphere is created/fed containing a limited amount of said at least one of the first, second, third or fourth water for addition of said at least one of the first, second, third or fourth water to said lime compound.

Indeed, if the step of forming the prehydrated lime, the paste of lime or the milk of lime is a continuous process, the quicklime is transported within a hydrator or hydrator-like vessel and therefore has a residence time. To control the taking up of water, by quicklime, one can act on the flow rate of water, taking into account the speed of lime introduction during the transport into the hydrator or hydrator-like vessel, the size of at least water droplets and/or the distance along which water is added.

Said progressive addition of said at least one of the first, second, third or fourth water to said lime compound being a continuous process during which progressive hydration of said lime compound is performed by adjusting lime compound feeding rate into the hydrator fed by predetermined atmosphere of a limited amount of said at least one of the first, second, third or fourth water may be according to the present invention either said at least one of the first, second, or fourth water added to quicklime, said third water or said fourth water added to prehydrated lime, said fourth water added to paste of lime.

In a third particular embodiment of the process according to the present invention, said progressive addition of said at least one of the first, second, third or fourth water is a batch process during which progressive hydration of said lime compound is performed by placing a predetermined amount of lime compound into a hydrator wherein a predetermined atmosphere is created/fed containing a limited amount of said at least one of the first, second, third or fourth water for addition of said at least one of the first, second, third or fourth water to said lime compound.

In a fourth particular embodiment of the process according to the present invention, said progressive addition of said at least one of the first, second, third or fourth water is performed by spraying a mist of said at least one of the first, second, third or fourth water into a hydrator.

Preferably, said mist of said at least one of the first, second, third or fourth water presents a controlled size of droplets of addition of said at least one of the first, second, third or fourth water. The size of the water droplets also allows the control of the hydration reaction for forming the prehydrated lime, the paste of lime or even the milk of lime and therefore the quality of the resulting lime compound provided to the step of the process of forming the milk of slaked lime of great fineness. Indeed, the size of the water droplets may prove of relevant impact since those latter should have a size big enough to not be evaporated before reaching the quicklime and allowing the hydration reaction to occur but at the same time not too big to avoid local non homogeneous hydration of particles which would undesirably lead to non-homogeneous lime compound.

Said progressive addition of said at least one of the first, second, third or fourth water to said lime compound performed by spraying a mist of said at least one of the first, second, third or fourth water into a hydrator may be according to the present invention either said at least one of the first, second, or fourth water added to quicklime, said third water or said fourth water added to prehydrated lime, said fourth water added to paste of lime.

In a particular embodiment of the process according to the present invention, said lime compound is quicklime onto which a said fourth water being process water is progressively added until said milk of lime of great fineness is reached.

In another particular embodiment according to the present invention, said first lime compound is chosen in the group consisting of prehydrated lime, paste of lime and their mixture obtained from quicklime onto which a first water or a second water being process water is progressively added for forming said first lime compound.

Advantageously, said milk of lime of great fineness is obtained by further addition of a fourth water being an aqueous phase chosen in the group of clean water, process water, clean water with additives, process water with additives and their mixture to said first lime compound.

In a variant of the process according to the present invention, said milk of lime of great fineness is obtained by further addition of said first lime compound to a fourth water being an aqueous phase chosen in the group of clean water, process water, clean water with additives, process water with additives and their mixture.

In an alternative particular embodiment according to the present invention, said first lime compound is a paste of lime obtained from prehydrated lime onto which said third water being process water is progressively added.

Advantageously, said milk of lime of great fineness is obtained by further addition of a fourth water being an aqueous phase chosen in the group of clean water, process water, clean water with additives, process water with additives and their mixture to said first lime compound Alternatively, said milk of lime of great fineness is obtained by further addition of said first lime compound to a fourth water being an aqueous phase chosen in the group of clean water, process water, clean water with additives, process water with additives and their mixture.

In yet a particular embodiment, said third and said fourth water are a same water and wherein said first lime compound is prehydrated lime onto which said third water, being said fourth water and being process water is progressively added until said milk of lime is reached.

In a particularly advantageous embodiment of the process according to the present invention, the process comprises an addition of at least one additive, said additive being added to or contained into said at least one of the first, second, third and fourth water or added to or contained into said lime compound. The additive can be a solid additive, a liquid additive, for example, but not limited thereto a suspension of said additive or a solution of said additive.

Preferably, said additive is chosen in the group consisting of carbohydrates, sugars, alcohol sugars, in particular sorbitol, carbon dioxide, phosphates, sulfates, bicarbonates, silicates, phosphonates, polyacrylates, polycarboxylic acids, low molecular weight organic acids, mixtures and derivatives thereof.

More preferably, said at least one of the first, second, third and fourth water being process water is an aqueous phase chosen in the group consisting of water comprising endogenous salt, industrial alkaline aqueous phase, industrial high sulfate water, saturated gypsum solutions, seawater, saline and hypersaline water, Brackish water and their mixture, recycled or not.

Especially, the process water according to the present invention can be recycled water comprising endogenous salt, recycled industrial alkaline aqueous phase, recycled industrial high sulfate water, recycled saturated gypsum solutions, recycled seawater, recycled saline and hypersaline water, recycled Brackish water and their mixture.

In yet another preferred embodiment of the process according to the present invention, said process water comprises at least 1 $g/dm^3$, in particular at least 5 $g/dm^3$, preferably at least 10 $g/dm^3$, most preferably at least 20 $g/dm^3$, in particular at least 40 $g/dm^3$ mineral salt including mineral sulfate or sodium salt and their mixture.

In a specific embodiment of the process according to the present invention, the proportion of process water to the total amount of water used is higher than 40 w %, preferentially higher than 60 w %, more preferentially more than 80 w % and up to 100 w %.

In another specific embodiment of the process according to the present invention, the process further comprises a sieving or selection step to remove coarser particles greater than 1 mm, preferentially greater than 500 µm, more preferentially 200 µm from the milk of lime of great fineness.

Preferably, the sieving or section step is performed by a stainless steel sieve.

Other embodiments of the process according to the present invention are mentioned in the annexed claims.

The present invention also relates to a milk of slaked lime of great fineness comprising slaked lime particles in suspension into an aqueous phase, wherein the slaked lime particles presents a $d_{50}$ greater than or equal to 1.5 µm, and lower than or equal to 5 µm, more particularly lower than or equal to 4 µm, even more particularly lower than or equal to 3 µm and wherein said milk of lime or aqueous phase further contains mineral salt including mineral sulfate or sodium salt and their mixture, at a level of at least 1 $g/dm^3$, in particular at least 5 $g/dm^3$, preferably at least 10 $g/dm^3$, most preferably at least 20 $g/dm^3$, in particular at least 40 $g/dm^3$.

The notation $d_x$ represents a diameter, expressed in µm, relative to which X % of the particles or grains measured are smaller.

The milk of slaked lime of great fineness according to the present invention is therefore a milk of lime wherein not only $d_{50}$ is reduced compared to conventional milk of lime of great fineness but also the presence of coarse fraction agglomerates is reduced.

Advantageously, in the milk of slaked lime according to the present invention, said aqueous phase comprises an additive chosen in the group consisting of carbohydrates, sugars, alcohol sugars, in particular sorbitol, carbon dioxide, phosphates, sulfates, bicarbonates, silicates, phosphonates, polyacrylates, polycarboxylic acids, low molecular weight organic acids, mixtures and derivatives thereof.

In a preferred embodiment according to the present invention the milk of slaked lime presents a solid content greater than 20 w %, preferably greater than 30 w %, more preferably greater than 35 w %, and most preferably greater than 40 w %, with respect to the total weight of the milk of lime, said solid content being lower than or equal to 55 w %, preferably lower than or equal to 50 w %, in particular lower than or equal to 45 w % with respect to said total weight of the milk of slaked lime.

In a preferred embodiment according to the present invention, stabilizing additives/viscosity reducer/viscosity stabilizer can be added to adjust the viscosity of the milk of slaked lime.

Preferably, the milk of slaked lime according the present invention has a viscosity measured with a Brookfield DV-3B Rheometer using the predetermined spindle (as below mentioned) at a rotational speed of 100 rpm lower than 1500 mPa·s, preferably lower than 1200 mPa·s, in particular lower than 1000 mPa·s, particularly lower than 900 mPa·s, more particularly lower than 800 mPa·s, even lower than 600 mPa·s, particularly lower than 450 mPa·s and more preferably lower than 300 mPa·s.

Refer to the table below for the predetermined spindle for the respective viscosity range at a rotational speed of 100 rpm:

| Spindle | Viscosité Min | Viscosité Max |
| --- | --- | --- |
| 61 or LV-1 | | 60 mPa · s |
| 62 or LV-2 | 60 mPa · s | 300 mPa · s |
| 63 or LV-3 | 300 mPa · s | 1200 mPa · s |
| 64 or LV-4 | 1200 mPa · s | 6000 mPa · s |

In the context of the present invention, the wording viscosity was used to designate dynamic or absolute viscosity. Dynamic viscosity or absolute viscosity designate viscosity that is either measured in the centipoise (cP) or in the millipascal-second (mPa·s) units.

In a particularly advantageous embodiment according to the present invention, the milk of slaked lime of great fineness present a settling rate comprised between about 1 and 2 vol. % after 24 hours as measured according to ASTM C110-11.14.

In another preferred embodiment according to the present invention, said aqueous phase of the milk of lime comprises less than 2 g/dm$^3$ of total organic carbon, preferentially less than 1.2 g/dm$^3$, more preferentially less than 0.8 g/dm$^3$ of total organic carbon.

Other embodiments of the milk of slaked lime according to the present invention are mentioned in the annexed claims.

The present invention also relates to the use of process water for manufacturing a milk of lime of great fineness in a hydration process with a fourth water of a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture, said process water being used as first, second, third or fourth water, said third and said fourth water being the same or different, for forming a milk of slaked lime of great fineness with said lime compound.

Preferably, according to the use of the present invention, at least one additive is added, said additive being added to or contained into said at least one of the first, second, third and fourth water or added to or contained into said lime compound.

More particularly, in the use according to the present invention, said additive is chosen in the group consisting of carbohydrates, sugars, alcohol sugars, in particular sorbitol, carbon dioxide, phosphates, sulfates, bicarbonates, silicates, phosphonates, polyacrylates, polycarboxylic acids, low molecular weight organic acids, mixtures and derivatives thereof.

In a preferred use according to the present invention, said at least one of the first, second, third and fourth water being process water is an aqueous phase chosen in the group consisting of water comprising endogenous salt, industrial alkaline aqueous phase, industrial high sulfate water, saturated gypsum solutions, seawater, saline and hypersaline water, Brackish water and their mixture, recycled or not.

In a particularly preferred use according to the present invention, said at least one of the first, second, third and fourth water being process water comprises at least 1 g/dm$^3$, preferentially at least 5 g/dm$^3$, in particular at least 10 g/dm$^3$, more particularly at least 20 g/dm$^3$ and even preferentially at least 40 g/dm$^3$ mineral salt including mineral sulfate or sodium salt and their mixture.

Other embodiments of the use of process water to manufacture a milk of lime of great fineness according to the present invention are mentioned in the annexed claims.

The present invention also relates to a device for producing a milk of lime of great fineness comprising a hydration zone provided to comprise a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture, said hydration zone comprising an opening connected to a feeding means provided for feeding at least a first, a second, a third or a fourth water being process water onto said lime compound, said feeding means being in fluid connection with a process water storage means, and a second opening connected to a collecting means provided to collect a second lime compound, chosen in the group consisting of prehydrated lime, paste of lime and milk of lime, said feeding means comprising further spraying means or flow rate controlling means.

Other embodiments of the device according to the present invention are mentioned in the annexed claims.

The present invention also relates to a plant for producing a milk of lime of great fineness comprising a device according the present invention and a process water storage means containing water process exit means connected to said feeding means of said device.

Other embodiments of the plant according to the present invention are mentioned in the annexed claims.

Other characteristics, details and advantages of the present invention are explained in the following description, given hereunder, by making reference to the drawings and examples, while not being limited thereto.

The present invention relates to a process for manufacturing a milk of lime of great fineness comprising at least the steps of a) providing a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture, and b) forming a milk of slaked lime of great fineness with said lime compound by the addition of a fourth water to said lime compound or by the addition of the first lime compound to a fourth water
wherein at least one of the first, second, third or fourth water is process water and wherein at least one of the first, second, third or fourth water is added to said lime compound.

Milk of slaked lime is a suspension of hydrated lime in water and can be formed from either hydrated lime or quicklime; however, preferred milk of slaked lime used herein is produced from prehydrated lime or paste of lime obtained by the addition of water to lime rather than lime to water. The quicklime used for the purposes discussed herein may be "high calcium" lime, which contains no more than about 5 percent magnesium oxide or hydroxide.

According to the present invention, several embodiments are encompassed within the scope of the process for manufacturing a milk of lime of great fineness. Most of them will be described hereunder, without limitative effect.

In a first preferred embodiment, an aqueous phase called a fourth water being process water is added to quicklime progressively until a milk of lime is produced. Successively, the quicklime is partly hydrated forming locally a prehydrated lime which progressively disappears upon water addition to form a paste of lime, which is then progressively diluted until a milk of lime of great fineness is obtained.

In a second preferred embodiment, an aqueous phase called a first water is added to quicklime to form a prehydrated lime. The prehydrated lime is then further hydrated to form a milk of lime. The further hydration passes or not through the step wherein a paste of lime is formed to progressively disappear and form the milk of lime. The further hydration is made by adding the fourth water to the prehydrated lime or by adding the prehydrated lime to fourth water. The milk of lime of great fineness is reached even if either the first or the fourth water or even the first and the fourth water is a process water.

According to this second preferred embodiment, the prehydrated lime may be formed in one hydrator which can either be on-site or remote from the hydrator wherein the milk of lime is produced. This means as well that the prehydrated lime can be also a commercially available prehydrated lime that is shipped on-site where the milk of lime of great fineness is produced.

In a third preferred embodiment, an aqueous phase called a second water is added to quicklime to form a paste of lime. The paste of lime is then further hydrated to form a milk of lime. The further hydration is made by adding the fourth water to the paste of lime or by adding the paste of lime to fourth water. The milk of lime of great fineness is reached even if either the second or the fourth water or even the second and the fourth water is a process water.

According to this third preferred embodiment, the paste of lime may be formed in one hydrator which can either be on-site or remote from the hydrator wherein the milk of lime is produced. This means as well that the paste of lime can be also a commercially available paste of lime that is shipped on-site where the milk of lime of great fineness is produced.

In a fourth preferred embodiment, an aqueous phase called a third water is added to prehydrated lime to form a paste of lime. The paste of lime is then further hydrated to form a milk of lime. The further hydration is made by adding the fourth water to the paste of lime or by adding the paste of lime to fourth water. The milk of lime of great fineness is reached even if either the third or the fourth water or even the third and the fourth water is a process water.

According to this fourth preferred embodiment, the paste of lime may be formed in one hydrator which can either be on-site or remote from the hydrator wherein the milk of lime is produced. This means as well that the paste of lime can be also a commercially available paste of lime that is shipped on-site where the milk of lime of great fineness is produced.

In a fifth embodiment, prehydrated lime is added to an aqueous phase called a third water to form a paste of lime. The paste of lime is then further hydrated to form a milk of lime with the fourth water being the same or different to the third water. The further hydration is hence made by adding the fourth water to the paste of lime or may be done by adding the paste of lime to fourth water. The milk of lime of great fineness is reached even if either the third or the fourth water or even the third and the fourth water is a process water.

In some case where the third water is clean water, the prehydrated lime has been obtained by adding process water to quicklime and the fourth water may be process water or clean water, which fourth water can be added to the paste of lime or in the contrary, the paste of lime can be added to the fourth water.

In an alternative where the third water is clean water, the prehydrated lime has been obtained by adding clean water to quicklime and the fourth water is process water, which fourth water can be added to the paste of lime or in the contrary, the paste of lime can be added to the fourth water.

In fact, if the milk of slaked lime of great fineness is formed from prehydrated lime, the particles of prehydrated lime are further slaked with a predetermined volume of third water for forming the paste of lime. The third water can be added to the prehydrated lime or in the contrary, the prehydrated lime can be added to the third water. The further addition of the fourth water forms the milk of slaked lime. In this latter case, the volume of the fourth water can be added to the paste of lime or in the contrary, prehydrated lime can be added to the volume of water. Of course, prehydrated lime is exclusively formed by the addition of water to quicklime and not the contrary. The third or the fourth or even both the third and the fourth water is process water.

According to this fifth preferred embodiment, the paste of lime may be formed in one hydrator which can either be on-site or remote from the hydrator wherein the milk of lime is produced. This means as well that the paste of lime can be also a commercially available paste of lime that is shipped on-site where the milk of lime of great fineness is produced In a sixth embodiment, the third and the fourth water are the same water and prehydrated lime is added to an aqueous phase called a third water being the fourth water also to form the milk of lime, continuously and progressively. The paste of lime formed therefore in situ progressively disappears upon further hydration to form a milk of lime with the fourth water being the same as the third water. In this case the third and the fourth water are bot the same process water.

The preferred milk of slaked lime used herein will contain about 20-55% by weight of solids, preferably about 40-50% by weight of solids, and most preferably about 45% by weight of solids, based upon the total weight of the milk of slaked lime.

This invention's goal is to produce milk of slaked lime with fine particle size distribution. This property is achieved by the process according to the invention comprising a first step of providing a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture. The first step is followed by a step of forming a milk of slaked lime of great fineness which in its preferred form presents a particle size distribution $d_{50}$ comprised between 2-5 µm or even between 2.5-3.5 µm, showing a slaked lime content of 20-55% by weight of solids, with said lime compound by the addition of a fourth water to said lime compound or by the addition of the first lime compound to a fourth water, wherein at least one of the first, second, third or fourth water is process water and in that at least one of the first, second, third or fourth water is added to said lime compound.

In the discussion which follows, the particle sizes distributions (also called granulometries) are measured by means of a laser granulometer in methanol; these distributions are characterized in terms of, for example, $d_{50}$, $d_{90}$ and $d_{98}$, interpolated values of the particle size distribution curves. The dimensions $d_{50}$, $d_{90}$ and $d_{98}$ correspond to the dimensions for which respectively 50%, 90% and 98% of the particles are less than a given value.

The viscosity of these milks of lime is measured according to standard industry practice, as by the use of a "Brookfield DV III Rheometer" viscometer, with the predetermined spindle at 100 rpm. Indeed, in this method, the spindle must be adapted according to the viscosity range of the measured sample. For 100 rpm rotation speed, the predetermined spindle is spindle No 1 (or 61) for sample having a viscosity up to 60 cP; spindle No 2 (or 62) for about 60 up to 300 cP; spindle No 3 (or 63) for about 300 up to 1200 cP; and spindle No 4 (or 64) for about 1200 up to 6000 cP. The measurement was taken on the 30th second, once the viscometer motor was turned on.

The present invention will be described more precisely with the example of a lime compound as a starting material being quicklime. However, the milk of slaked lime of great fineness according to the present invention can be obtained from a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture.

Indeed, it has been found that the selection of specific lime compound chosen in the group consisting of a lime compound chosen in the group of quicklime, a first lime compound and their mixture, said first lime compound being chosen in the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture obtained by addition of at least one of the said first, second, third and fourth water to the lime compound instead of addition of said lime compound to water shares the concept that milk of slaked lime of great fineness is obtained due to the intermediate existence upstream or during the process according to the present invention of prehydrated lime compounds, which intermediate product progressively disappears more or less along water addition until the paste of lime or the milk of lime is formed.

According to the present invention, said progressive addition of said at least one of the said first, second, third, and/or fourth water is a spraying step of said at least one of the said first, second, third, and/or fourth water for controlling water uptake by the lime compound, or a continuous pattern of addition of said at least one of the said first, second, third, and/or fourth water for controlling water uptake by the lime compound, under agitation. This means that the volume of said at least one of the said first, second, third, and/or fourth water added to the lime compound required to slake entirely the lime cannot be added at once, but progressively, to ensure the intermediate existence of prehydrated lime.

In one preferred embodiment according to the present invention, the process water but also any further water added in the process according to the present invention may comprise one or more additives for example, chosen in the group consisting of carbohydrates, sugars, alcohol sugars, in particular sorbitol, carbon dioxide, phosphates, sulfates, bicarbonates, silicates, phosphonates, polyacrylates, polycarboxylic acids, low molecular weight organic acids, mixtures and derivatives thereof.

The process water is an aqueous phase chosen in the group consisting of water comprising endogenous salt, industrial alkaline aqueous phase, industrial high sulfate water, saturated gypsum solutions, seawater, saline and hypersaline water, Brackish water and their mixture recycled or not and can be for example recycled water comprising endogenous salt, recycled industrial alkaline recycled aqueous phase, recycled industrial high sulfate water, recycled saturated gypsum solutions, recycled seawater, recycled saline and hypersaline water, recycled Brackish water and their mixture.

In still another variant, the process water comprises at least 1 g/dm$^3$, preferably at least 5 g/dm$^3$, in particular at least 10 g/dm$^3$, more particularly at least 20 g/dm$^3$ and more preferably at least 40 g/dm$^3$ mineral salt including mineral sulfate or sodium salt and their mixture.

EXAMPLES

In the hereunder examples, the lime used is a lime from the Tapah plant, being typically a quicklime which produces under normal slaking conditions of adding quicklime to water a rather high viscosity milk of lime.

Example 1

2100 g of finely crushed quicklime as lime compound with a top size of 2 mm was placed in a 20 dm$^3$ horizontally agitated laboratory paste mixer of the type Lôdige M-20

MK. This mixer provides agitation by 2 plow shares and 2 wall scrapers, which were fixed to the agitator axis and allow to mix powder, paste and slurry products.

The lid on top of the mixer was equipped with a water dosing system, i.e. a water line ending a nozzle, and a thermally and chemically resistant filter, which allowed any formed vapour to escape out of the mixer to an external ventilation system.

An industrial process water (fourth water) was fed at a rate of 3.0 g/sec to the reactor and thus sprayed through the nozzle onto the lime. In total 4.2 kg of this process water were added in the course of ca. 25 min.

The industrial process water contained ca. 2 g/dm$^3$ of sodium hydroxide, 11 g/dm$^3$ of sodium carbonate, ca. 7 g/dm$^3$ of sodium aluminate, ca. 2 g/dm$^3$ of sodium sulphate, ca. 0.5 g/dm$^3$ sodium chloride and 5-15 g/dm$^3$ of organic impurities, which were derived from humates.

Additionally, ca. 10 g of sorbitol were added to the water.

After completion of the dosing, the mixture is left under agitation in the mixer till cooled down to less than 50° C. Then it is removed from the mixer, screened at 2 mm through a sieve and analysed for solid content, viscosity and particle size distribution. The particle size distribution is measured with a Beckman-Coulter LS 13 320 Laser Diffraction Particle Sizer with an internal sonication cell in the recirculation circuit of the methanolic sample suspension. Sonication is applied in this cell for 30 sec at 50% of the maximum intensity prior to 2 measurement runs on the same sample. The results of these two runs are checked and compared, and if the 2 particle size distribution results match to a good level of confidence (based on the common standard deviation for these type of measurements with the equipment), the average of the 2 runs is taken as the final particle size distribution result. Otherwise, the measurement is repeated on the same sample, but without a second sonication.

This experiment was repeated at the same conditions for a second time.

Solid content was determined by residual weight after drying in an infra-red thermobalance at 110° C. Viscosity was measured with a Brookfield DV-3B Rheometer using the predetermined spindle at a rotational speed of 100 rpm.

Particle size distribution was measured with a Beckman-Coulter LS 13 320 Laser Diffraction Particle Sizer using methanol as carrier solvent.

The results are shown in Table 1

TABLE 1

| Run | Viscosity [cPs] | Solid Content [wt. %] | $d_{50}$ [μm] | $d_{90}$ [μm] | $d_{97}$ [μm] |
| --- | --- | --- | --- | --- | --- |
| 1 | 230 | 45.0 | 2.29 | 21.2 | 40.8 |
| 2 | 190 | 45.0 | 2.37 | 11.7 | 33.6 |

The suspensions were then diluted by addition of demineralized water to the milk of lime to 23.0 wt. % solids content for easier comparison of the viscosity to the comparative examples. The results of the viscosity and solid content are shown in Table 2.-

TABLE 2

| Run | Viscosity [cPs] | Solid Content [wt. %] |
| --- | --- | --- |
| 1 | 22 | 23.0 |
| 2 | 18 | 23.0 |

Comparative Example 1

The same experimental conditions as in Example 1.- were used, including the amount of quicklime, the amount of slaking water and sorbitol.

Also the same finely crushed quicklime was used. But instead of the process water, demineralized water was employed. The results are shown in Table 3.-

TABLE 3

| Run | Viscosity [cPs] | Solid Content [wt. %] | $d_{50}$ [μm] | $d_{90}$ [μm] | $d_{97}$ [μm] |
| --- | --- | --- | --- | --- | --- |
| 3 | 240 | 39.1 | 2.76 | 32.1 | 54.8 |

As it can be seen, the solids content of Comparative example 1 was reduced in comparison to Example 1, as a significant amount of pasty material was adhering to the agitator.

Still, it can be observed that viscosity is similar despite the lower solid content and the particle size is less fine for this product obtained with clean water compared to the previous two obtained with the process water.

Comparative Example 2

The same type of finely crushed quicklime as in Example 1 is slaked with the same industrial process water in a continuous pilot slaking installation, meaning that lime is added to water instead of according to the present invention where water is added to quicklime.

This pilot installation consists of a 10 dm$^3$ stirred tank reactor with double jacket, a screw feeder with hopper to continuously dose the quicklime, a dosing pump to continuously feed the slaking water and another dosing pump to continuously remove the slaked lime suspension from the reactor. The reactor is equipped with a thermostatic heating bath to control its temperature, a high capacity reflux cooler with attached ventilation system to withdraw any generated vapour and thermocouples at different positions to monitor reactor temperature.

The agitation of the reactor has been designed and validated to provide agitation similar to industrial detention slakers. The reactor was fed continuously with 90 g/min of quicklime and 450 g/min of slaking water for an average residence time of ca. 20 min. Slaking temperature in the reactor was 80° C. The results of the milk-of-lime quality is shown in Table 4 and was obtained at steady state conditions (after ca. 7 residence times of operation).

TABLE 4

| Run | Viscosity [cPs] | Solid Content [wt. %] | $d_{50}$ [μm] | $d_{90}$ [μm] | $d_{97}$ [μm] |
| --- | --- | --- | --- | --- | --- |
| 1 | 40 | 25.6 | 8.33 | 52.6 | 75.7 |

Comparative Example 3

Comparative example 2 was reproduced, but demineralized water was used instead of process water. The results are shown in table 5.-

TABLE 5

| Run | Viscosity [cPs] | Solid Content [wt. %] | $d_{50}$ [μm] | $d_{90}$ [μm] | ~~$d_{97}$~~ [μm] |
|---|---|---|---|---|---|
| 2 | 200 | 23.0 | 4.5 | 20 | 40 |

As it can be seen, the effect of the industrial process water in classical, continuous slaking as practiced in industry is thus a significant coarsening of the milk-of-lime (Comparative example 2) in comparison to clean water (Comparative example 3).

Example 2

The same experiment at the same conditions as according to Example 1 was conducted, but using a solution of sulphate salts, i.e. 10 g/dm$^3$ of magnesium sulphate and 2 g/dm$^3$ of sodium sulphate. Both salts were added in their anhydrous form as chemicals to demineralized water to produce this solution.

After completion of the slaking experiment, the obtained milk-of-lime suspension was screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 6 were obtained.

TABLE 6

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 215 | 43.7 | 3.74 | 29.3 | 51.8 | 15.7% | 1.0% |

The suspensions were then diluted by addition of demineralized water to 26.6 wt. % solids content for easier comparison of the viscosity to the comparative examples. The results are shown in Table 7.-

TABLE 7

| Run | Viscosity [cPs] | Solid Content [wt. %] |
|---|---|---|
| 1 | 8 | 26.6 |

Comparative Example 4

The same lime as according to Example 1 was slaked in an experimental set-up as described in the norm EN 459-2, section 5.10: 'Reactivity'. 150 g of finely crushed lime of a maximum particle size of 2 mm are added to 600 g of the same solution as in Example 2 with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 8.- were obtained.

TABLE 8

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 5 | 18 | 16.5 | 73 | 91 | 1.2% | 2.8% |

Example 3

The same experiment at the same conditions according to Example 1 was conducted, but using another solution of sulphate salts, i.e. 30 g/dm$^3$ of magnesium sulphate and 5 g/dm$^3$ of sodium sulphate. Both salts were added in their anhydrous form as chemicals to demineralized water to produce this solution.

After completion of the slaking experiment, the obtained milk-of-lime suspension was screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 9.- were obtained.

TABLE 9

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 215 | 44.9 | 4.5 | 40.3 | 59.1 | 19.0% | 1.4% |

The suspensions were then diluted by addition of demineralized water to 26.6 wt. % solids content for easier comparison of the viscosity to the comparative example. The results are shown in Table 10.-

TABLE 10

| Run | Viscosity [cPs] | Solid Content [wt. %] |
|---|---|---|
| 1 | 8 | 26.6 |

Comparative Example 5

The same lime as in Example 1 was slaked in an experimental set-up as described in the norm EN 459-2, section 5.10: 'Reactivity'. 150 g of finely crushed lime of a max. size of 2 mm are added to 600 g of the same solution as in Example 3 with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 11.- were obtained.

TABLE 11

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 14 | 21.8 | 10.2 | 57.3 | 80.9 | 11.3% | 3.4% |

Example 4

The same experiment at the same conditions according to Example 1 was conducted, but using a solution saturated in calcium sulphate, thus containing ca. 1.4 g/dm³ of dissolved calcium sulphate. Analytical grade gypsum was used to saturate the solution.

After completion of the slaking experiment, the obtained milk-of-lime suspension was screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 12.- were obtained.

TABLE 12

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 1300 | 40.1 | 2.81 | 24.8 | 43.3 | 9.6% | 15.7% |

The suspensions were then diluted by addition of demineralized water to 22 wt. % solids content for easier comparison of the viscosity to the comparative examples. The results are shown in Table 13.-

TABLE 13

| Run | Viscosity [cPs] | Solid Content [wt. %] |
|---|---|---|
| 1 | 63 | 22.0 |

TABLE 14

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 3 | 26.4 | 16.45 | 66.4 | 112.7 | 0.3% | 1.8% |

Example 5

The same experiment at the same conditions according to Example 1 was conducted, but using a solution of sodium chloride, i.e. 10 g/dm³ of analytical grade sodium chloride were added to demineralized water to produce this solution.

After completion of the slaking experiment, the obtained milk-of-lime suspension was screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 15.- were obtained

TABLE 15

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 1480 | 37.8 | 2.80 | 31.3 | 64.6 | 4.8% | 5.3% |

The suspensions were then diluted by addition of demineralized water to 20.4 wt. % solids content for easier comparison of the viscosity to the comparative examples. The results are shown in Table 16.-

TABLE 16

| Run | Viscosity [cPs] | Solid Content [wt. %] |
|---|---|---|
| 1 | 43 | 20.4 |

Comparative Example 6

The same lime as according to Example 1 was slaked in a test set-up described in the norm EN 459-2, section 5.10: 'Reactivity'. 150 g of finely crushed lime of a max. size of 2 mm are added to 600 g of the same solution as in Example 4 with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 14.- were obtained.

Comparative Example 7

The same lime as in Example 1 was slaked in a test set-up described in the norm EN 459-2, section 5.10: 'Reactivity'. 150 g of finely crushed lime of a max. size of 2 mm are added to 600 g of the same solution as in Example 5 with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 17.- were obtained.

TABLE 17

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 21 | 28 | 6.22 | 31.9 | 52.5 | 8.0% | 0.5% |

Example 6

The same experiment at the same conditions as according to Example 1 was conducted, but using another solution of sodium chloride, i.e. 40 g/dm³ of analytical grade sodium chloride were added to demineralized water to produce this solution.

After completion of the slaking experiment, the obtained milk-of-lime suspension was screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results in Table 18.- were obtained.

TABLE 18

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 2400 | 43.1 | 2.87 | 11.7 | 29.7 | 5.9% | 12.4% |

The suspensions were then diluted by addition of demineralized water to 21.0 wt. % solids content for easier comparison of the viscosity to the comparative example. The results are shown in table 19.-

TABLE 19

| Run | Viscosity [cPs] | Solid Content [wt. %] |
|---|---|---|
| 1 | 59 | 21.0 |

Comparative Example 8

The same lime as according to Example 1 was slaked in a test set-up described in the norm EN 459-2, section 5.10: 'Reactivity'. 150 g of finely crushed lime of a max. size of 2 mm are added to 600 g of the same solution as in Example 6 with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results in Table 20.- were obtained.

TABLE 20

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 17 | 29.6 | 7.86 | 45.9 | 67 | 7.6% | 0.4% |

Example 7

The same experiment at the same conditions as Example 1 was conducted, but using another solution with the composition of seawater, i.e.:
27.4 g/dm³ NaCl
3.4 g/dm³ MgCl₂
2.1 g/d MgSO₄
1.4 g/dm³ CaSO₄
0.7 g/d KCl This solution was produced from analytical grade anhydrous salts added to demineralized water.

After completion of the slaking experiment, the obtained milk-of-lime suspension was screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 21.- were obtained.

TABLE 21

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
|---|---|---|---|---|---|---|---|
| 1 | 2400 | 43.4 | 3.86 | 52.8 | 71.7 | 19.1% | 8.4% |

The suspensions were then diluted by addition of demineralized water to 21.8 wt. % solids content for easier comparison of the viscosity to the comparative example. The results are shown in Table 22.-

TABLE 22

| Run | Viscosity [cPs] | Solid Content [wt. %] |
|---|---|---|
| 1 | 27 | 21.8 |

Comparative Example 9

The same lime as according to Example 1 was slaked in a test set-up described in the norm EN 459-2, section 5.10: 'Reactivity'. 150 g of finely crushed lime of a max. size of 2 mm are added to 600 g of the same solution as in Example 7 with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in table 23.- were obtained.

TABLE 23

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
| --- | --- | --- | --- | --- | --- | --- | --- |
| 1 | 8 | 20.9 | 14.7 | 79.5 | 119 | 1.4% | 3.6% |

Example 8

The same experiment at the same conditions as Example 1 was conducted, but using a solution with the following composition:
195 g/dm$^3$ NaCl
15 g/dm$^3$ MgSO$_4$
7 g/dm$^3$ Na$_2$SO$_4$
1.4 g/dm$^3$ CaSO$_4$
1.5 g/dm$^3$ KCl
This solution was produced from analytical grade anhydrous salts added to demineralized water.

After completion of the slaking experiment, the obtained milk-of-lime suspension was screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in Table 24.- were obtained.

TABLE 24

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
| --- | --- | --- | --- | --- | --- | --- | --- |
| 1 | 147 | 49.6 | 5.49 | 61 | 85.9 | 8.8% | 3.2% |

The suspensions were then diluted by addition of demineralized water to 28.1 wt. % solids content for easier comparison of the viscosity to the comparative examples. The results are shown in Table 25.-

TABLE 25

| Run | Viscosity [cPs] | Solid Content [wt. %] |
| --- | --- | --- |
| 1 | 9 | 28.1 |

Comparative Example 10

The same lime as according to Example 1 was slaked in a test set-up described in the norm EN 459-2, section 5.10: 'Reactivity'. 150 g of finely crushed lime of a max. size of 2 mm are added to 600 g of the same solution as in Example 8 with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in table 26.- were obtained.

TABLE 26

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
| --- | --- | --- | --- | --- | --- | --- | --- |
| 1 | 18 | 35.7 | 15.1 | 70.2 | 91.8 | 14.1% | 1.5% |

Comparative Example 11

The same lime as according to Example 1 was slaked in a test set-up described in the norm EN 459-2, section 5.10: 'Reactivity'. 150 g of finely crushed lime of a max. size of 2 mm are added to 600 g of demineralized water with an initial solution temperature of 20° C. and slaked under agitation as described in the norm. The obtained suspension is then screened on stainless steel sieves first of 1000 μm and then of 200 μm. The screen rejects were dried, weighed and the weight expressed as fraction of the total solids in the suspension.

While solid content and viscosity were determined prior to the screening, the particle size distribution was measured after screening as described in Example 1. The results shown in table 27.- were obtained.

TABLE 27

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
| --- | --- | --- | --- | --- | --- | --- | --- |
| 1 | 175 | 26.7 | 4.56 | 26.8 | 62.9 | 13.0% | 0.2% |

Comparative Example 12

The same experimental conditions as in Comparative example 1 were used but with another starting quicklime.

While the quicklime of Comparative example 1 was of $t_{60}$ reactivity of 2.5 min (measured according to the procedure outlined in EN459-2), the quicklime sample used in this example is of low reactivity, i.e. a $t_{60}$ of 4.2 min and additionally contains impurities, notably sulphate at a content of ca. 0.18 wt. % SO$_3$, which would reduce the fineness of the obtained milk-of-lime.

Demineralized water was fed at a rate of 3.0 g/sec to the reactor and thus sprayed through the nozzle onto the lime. About 10 g of sorbitol had been added to and dissolved in the water in advance. In total 4.2 kg of this water were added in the course of ca. 25 min.

After completion of the dosing, the mixture is left under agitation in the mixer till cooled down to less than 50° C. Then it is removed from the mixer, screened first at 1 mm through a sieve and analysed for solid content and viscosity. Subsequently, it was screened at 200 μm and its particle size distribution determined. The results shown in table 28.- were obtained.

TABLE 28

| Run | Viscosity [cPs] | Solid Content [wt. %] | $d_{50}$ [μm] | $d_{90}$ [μm] | $d_{97}$ [μm] | Reject >200 μm [wt. % solids] | Reject >1 mm [wt. % solids] |
| --- | --- | --- | --- | --- | --- | --- | --- |
| 1 | 52 | 44.2 | 2.72 | 9.33 | 27.7 | 0.2% | 1.0% |

The suspensions were then diluted by addition of demineralized water to 21.2 wt. % solids content for easier comparison of viscosity to the comparative examples. The results are shown in Table 29.-

TABLE 29

| Run | Viscosity [cPs] | Solid Content [wt. %] |
|---|---|---|
| 1 | 10 | 21.2 |

Comparative Example 13

The same lime as in comparative example 12 was slaked in an experimental set-up as described in the norm EN 459-2, similarly as in comparative example 4.

While solid content and viscosity were determined prior to the screening, the particle size distribution was measured after screening as described in Example 1. The results shown in table 30.- were obtained.

TABLE 30

| Run | Viscosity [cPs] | Solid Content [wt. %] | $d_{50}$ [µm] | $d_{90}$ [µm] | $d_{97}$ [µm] | Reject >200 µm [wt. % solids] | Reject >1 mm [wt. % solids] |
|---|---|---|---|---|---|---|---|
| 1 | 123 | 26.7 | 4.96 | 11.61 | 27.5 | 0.0 | 0.0 |

In comparison with comparative example 12, we observe that a significantly lower $d_{50}$ and a lower viscosity were obtained in comparative example 12.

Comparative Example 14

The same lime as in Example 1 was slaked in an experimental set-up as described in the norm EN 459-2, section 5.10: 'Reactivity'. 150 g of finely crushed lime of a max. size of 2 mm are added to 600 g of the same process water as in example 9 with an initial solution temperature of 20° C. and slaked under agitation as described in the norm. The obtained suspension is then screened on stainless steel sieves first of 1000 µm and then of 200 µm. The screen rejects were dried, weighed and the weight expressed as fraction of the total solids in the suspension.

While solid content and viscosity were determined prior to the screening, the particle size distribution was measured after screening as described in Example 1. The results shown in table 31.- were obtained.

TABLE 31

| Run | Viscosity [cPs] | Solid Content [wt. %] | $d_{50}$ [µm] | $d_{90}$ [µm] | $d_{97}$ [µm] | Reject >200 µm [wt. % solids] | Reject >1 mm [wt. % solids] |
|---|---|---|---|---|---|---|---|
| 1 | 184 | 28.2 | 8.2 | 21.4 | 32.4 | 0.0% | 0.0% |

Compared to the reactivity test with demineralized water, the slaking in the same test set-up with process water did not reach 60° C. even though the test was monitored for more than 15 min.

Such a lack of heat generation was not noted on the slaking of Example 9, i.e. according to our invention, where again a milk of lime of lower $d_{50}$ and lower viscosity was obtained compared to this example.

Example 9

The same experiment at the same conditions as comparative example 12 was conducted, but using the industrial process water as described in Example 1 (i.e. method of the present invention with a low reactive quicklime). This industrial process water contained ca. 2 g/dm³ of sodium hydroxide, 11 g/dm³ of sodium carbonate, ca. 7 g/dm3 of sodium aluminate, ca. 2 g/dm³ of sodium sulphate, ca. 0.5 g/dm³ sodium chloride and 5-15 g/dm³ of organic impurities, which were derived from humates.

As in the other Examples, ca. 10 g of sorbitol were added to the water.

After completion of the slaking experiment, the obtained milk of lime suspension was screened on stainless steel sieves first of 1000 µm and then of 200 µm. The screen rejects were dried, weighed and the weight expressed as fraction of the total solids in the suspension.

While solid content and viscosity were determined prior to the screening, the particle size distribution was measured after screening as described in Example 1. The results shown in table 32.- were obtained.

TABLE 32

| Run | Viscosity [cPs] | Solid Content [wt. %] | $d_{50}$ [µm] | $d_{90}$ [µm] | $d_{97}$ [µm] | Reject >200 µm [wt. % solids] | Reject >1 mm [wt. % solids] |
|---|---|---|---|---|---|---|---|
| 1 | 976 | 46.7 | 2.3 | 9.6 | 36.9 | 0.5% | 0.0% |

The suspensions were then diluted by addition of demineralized water to 23.7 wt. % solids content for easier comparison of the viscosity to the comparative examples. The results are shown in Table 33.-

TABLE 33

| Run | Viscosity [cPs] | Solid Content [wt. %] |
|---|---|---|
| 1 | 80 | 23.7 |

While the invention has been shown in several of its forms, it is not thus limited and is susceptible to various changes and modifications without departing from the spirit thereof and from the enclosed claims.

The invention claimed is:

1. A process for manufacturing a milk of lime of great fineness comprising at least the steps of
    a) providing a lime compound selected from the group consisting of quicklime, a first lime compound and their mixture said first lime compound being, selected front the group consisting of prehydrated lime obtained by the addition of a first water to quicklime, paste of lime obtained by the addition of a second water to quicklime, paste of lime obtained by the addition of a third water to prehydrated lime, paste of lime obtained by the addition of prehydrated lime to a third water and their mixture, and
    b) forming a milk of slaked lime of great fineness with, said lime compound by the addition of a fourth water to said lime compound or by the addition of the first lime compound to a fourth water, characterized in that at least one of the first, second, third or fourth water is process water selected from the group consisting of alkaline water, saline water, sulfate water comprising from 3 to 300 g solute/L and in that at least one of the first, second, third or fourth water is added to said lime compound, said milk of lime of great fineness having slaked lime particles presenting a $d_{50}$ greater than or equal to 1 μm and lower than or equal to 6 μm, measured by laser diffraction using methanol as carrier solvent after screening of the milk of lime at 2 mm through a sieve for removing the grits.

2. Process for manufacturing a milk of lime of great fineness according to claim 1, wherein said at least one of the first, second, or fourth water is added to quicklime through a progressive addition of said at least one of the first, second, or fourth water to quicklime, under agitation conditions.

3. Process for manufacturing a milk of lime of great fineness according to claim 1, wherein said third water or said fourth water is added to prehydrated lime through a progressive addition of said third or fourth water to prehydrated lime under agitation conditions.

4. Process for manufacturing a milk of lime of great fineness according to claim 1, wherein said fourth water is added to paste of lime through a progressive addition of said fourth water to paste of lime under agitation conditions.

5. Process for manufacturing a milk of lime of great fineness according to claim 2, wherein said progressive addition of said at least one of the first, second, third or fourth water to said lime compound is presenting a pattern of addition of said at least one of the first, second, third or fourth water for controlling water uptake by the lime compound in a batch process or in a continuous process.

6. Process for manufacturing a milk of slaked lime of great fineness according to claim 2, wherein said progressive addition of said at least one of the first, second, third or fourth water is a continuous process during which progressive hydration of said lime compound is performed by adjusting lime compound feeding rate into a hydrator wherein a predetermined atmosphere is created containing a limited amount of said at least one of the first, second, third or fourth water for addition of said at least one of the first, second, third or fourth water to said lime compound.

7. Process for manufacturing milk of slaked lime of great fineness according to claim 2, wherein progressive addition of said at least one of the first, second, third or fourth water is performed by spraying a mist of said at least one of the first, second, third or fourth water into a hydrator.

8. Process for manufacturing milk of slaked lime of great fineness according to claim 2, wherein progressive addition of said at least one of the first, second, third or fourth water is a batch process during which progressive hydration of said lime compound is performed by placing a predetermined amount of lime compound into a hydrator wherein a predetermined atmosphere is created containing a limited amount of said at least one of the first, second, third or fourth water for addition of said at least one of the first, second, third or fourth water to said lime compound.

9. Process for manufacturing a milk of lime of great fineness according to claim 2, wherein said lime compound is quicklime onto which said fourth water being process water is progressively added until said milk of lime of great fineness is reached.

10. Process for manufacturing a milk of lime of great fineness according to claim 2, wherein said first lime compound is selected from the group consisting of prehydrated lime, paste of lime and their mixture obtained from quicklime onto which a first water or a second water being process water is progressively added for forming said first lime compound.

11. Process for manufacturing a milk of lime of great fineness according to claim 2, wherein said first lime compound is a paste of lime obtained from prehydrated lime onto which said third water being process water is progressively added.

12. Process for manufacturing a milk of lime of great fineness according to claim 2, wherein said third and said fourth water are a same water and wherein said first lime compound is prehydrated lime onto which said third water, being said fourth water and being process water is progressively added until said milk of lime is reached.

13. Process for manufacturing a milk of lime of great fineness according to claim 1, further comprising an addition of at least one additive, said additive being added to or contained into said at least one of the first, second, third and fourth water or added to or contained into said lime compound.

14. Process for manufacturing a milk of lime of great fineness according to claim 13, wherein said additive is selected from the group consisting of carbohydrates, sugars, alcohol sugars, carbon dioxide, phosphates, sulfates, bicarbonates, silicates, phosphonates, polyacrylates, polycarboxylic acids, low molecular weight organic acids, mixtures and derivatives thereof.

15. Process for manufacturing a milk of lime of great fineness according to claim 1, wherein said at least one of the first, second, third and fourth water being process water is an aqueous phase selected from the group consisting of water comprising endogenous salt, industrial alkaline aqueous phase, industrial high sulfate water, saturated gypsum solutions, seawater, saline and hypersaline water, Brackish water and their mixture, whether recycled or not.

16. Process for manufacturing a milk of limo of great fineness according to claim 1, wherein said process water comprises at least 1 g/L mineral salt including mineral sulfate or sodium salt and their mixture.

17. Process for manufacturing a milk of time of great fineness according to claim 1, wherein the proportion of process water to the total amount of water used is higher than 40 w%.

18. Process for manufacturing a milk of lime of great fineness according to claim 1, further comprising a sieving or selection step to remove particles greater than 1 mm.

* * * * *